United States Patent
Siska, Jr. et al.

(10) Patent No.: US 7,677,529 B2
(45) Date of Patent: Mar. 16, 2010

(54) ELECTROMECHANICAL OXYGEN VALVE AND REGULATOR

(75) Inventors: William D. Siska, Jr., Elma, NY (US); Robert Collins, Hamburg, NY (US)

(73) Assignee: Carleton Technologies, Inc., Orchard Park, NY (US)

( * ) Notice: Subject to any disclaimer, the term of this patent is extended or adjusted under 35 U.S.C. 154(b) by 239 days.

(21) Appl. No.: 12/020,166

(22) Filed: Jan. 25, 2008

(65) Prior Publication Data

US 2009/0189103 A1    Jul. 30, 2009

(51) Int. Cl.
 *F16K 31/04* (2006.01)
(52) U.S. Cl. .................. 251/77; 251/129.11; 251/359
(58) Field of Classification Search ............ 251/129.08, 251/129.11, 77, 64, 129.12, 129.13, 325, 251/344, 359, 337, 129.19
 See application file for complete search history.

(56) References Cited

U.S. PATENT DOCUMENTS

| | | | | |
|---|---|---|---|---|
| 3,091,925 A | * | 6/1963 | May et al. .................. | 251/344 |
| 3,219,052 A | | 11/1965 | Schaller et al. | |
| 5,040,559 A | | 8/1991 | Ewing | |
| 5,100,100 A | | 3/1992 | Benson et al. | |
| 5,261,457 A | * | 11/1993 | Zapata et al. ................ | 251/250 |
| 5,597,009 A | * | 1/1997 | Scherrer et al. ......... | 251/129.11 |
| 6,874,536 B2 | * | 4/2005 | Phillips et al. ........... | 137/514.7 |
| 6,874,761 B2 | * | 4/2005 | McCarty et al. ............. | 251/344 |
| 2004/0154668 A1 | | 8/2004 | Larsen et al. | |
| 2005/0211318 A1 | * | 9/2005 | Arnault et al. ......... | 137/625.67 |
| 2006/0065303 A1 | | 3/2006 | Atkins, Sr. | |
| 2007/0017573 A1 | | 1/2007 | Frampton | |
| 2007/0228315 A1 | * | 10/2007 | Miller ........................ | 251/343 |
| 2008/0245986 A1 | * | 10/2008 | Arnault et al. ......... | 251/129.11 |

FOREIGN PATENT DOCUMENTS

GB          2193644 A      2/1988

* cited by examiner

*Primary Examiner*—John Bastianelli
(74) *Attorney, Agent, or Firm*—Jaeckle, Fleischmann & Mugel, LLP

(57) ABSTRACT

An electromechanical valve assembly for controlling oxygen flow from a compressed oxygen source in an aircraft includes: a valve housing, an inlet, an outlet, a passageway allowing flow of oxygen from the inlet to the outlet, a spring-biased conical poppet movable within the passageway; a spring-biased pressure regulating piston engagable with the conical poppet to maintain it in an open position, a push rod engagable with the conical poppet to maintain it in a closed position, and a movable seat in the passageway that engages the conical poppet to regulate gas flow through the passageway. Actuation of an electric motor assembly to cause the seat to move upward results in closing of the valve assembly and shutting off of the oxygen flow. Actuation of the motor assembly to cause the seat to move downward results in opening of the valve assembly and regulation of the oxygen flow.

9 Claims, 1 Drawing Sheet

ELECTROMECHANICAL OXYGEN VALVE AND REGULATOR

FIELD OF THE INVENTION

The present invention relates to a gas control valve and, more particularly, to an electromechanical valve and pressure regulator for use in an aircraft.

BACKGROUND OF THE INVENTION

Emergency oxygen supply systems are installed on aircraft to supply oxygen to passengers upon loss of cabin pressure at altitudes above about 12,000 feet. The emergency oxygen supply devices typically include a source of supplemental breathable oxygen connected to a face mask that is released from an overhead storage compartment when needed. The flow of breathable oxygen should be sufficient to sustain passengers until cabin pressure is reestablished or until a lower, safer altitude can be reached.

The Federal Aeronautics Administration (FAA) requires that emergency oxygen supply systems be shut off at the high pressure source whenever the aircraft is on the ground for an extended period of time. The FAA also requires that, as part of preflight procedures, the oxygen be turned on before take-off.

Typically, the high pressure shut-off valve is attached to a cylinder of pressurized oxygen located in the tail section of the aircraft. Operation of this valve is generally accomplished from a remote location, most often from the cockpit of the airplane. Current designs to accommodate the FAA requirement generally include a system of cables that are tied to a lever in the cockpit. To actuate the valve, the pilot pushes or pulls the lever, thereby moving a cable attached to the valve located in the tail of the aircraft. Such cable systems have potential disadvantages, for example, binding during operation.

The following patents and patent applications, the disclosures of which are incorporated herein by reference, describe a variety of valve assemblies for controlling the flow of a gas:

UK Patent Application GB 2193644 discloses a combined gas release and gas pressure measuring device connected to a pressurized gas cylinder and preferably used together with a breathing mask and flexible hood. Gas is released from the cylinder by gripping a knob and moving it to break a seal in a gas delivery tube. Gas pressure is measured by a Bourdon tube included in the device.

US Patent Application US 2007/0017573 describes an electromechanical system for regulating passenger oxygen flow during flight, the electronic portion of the system including inlet and outlet solenoid valves that enable the system to automatically revert to mechanical operation in the event of electronic or power supply failure.

US Patent Application US 2004/0154668 describes a gas control assembly that is mountable in the neck of a pressure vessel and extendable into the vessel interior, and includes a relief device that permits the exhaust of fluid from the vessel in the event of temperature and/or pressure exceeding a preselected value.

US Patent Application US 2006/0065303 describes a safety valve for a tank of pressurized gas that includes a check valve within the tank opening that operates to shut of the flow of gas in the event of a damaging lateral impact.

U.S. Pat. No. 5,040,559 describes an apparatus for controlling gas flow between an input port and an output port that comprises a valve between the input and output ports, a first actuating mechanism for operating the valve to control the gas flow rate between the input and output ports, and a second actuating mechanism for closing the valve and shut off flow between the ports, the second actuating mechanism being constructed to be selectively disengaged from the valve to permit the first actuating mechanism to operate the valve.

U.S. Pat. No. 5,100,100 describes a fluid control and shut-off valve assembly having a single valve that includes a valve body, a valve seat, and an actuator that includes an electromechanical force generating device, the valve body and seat being movable relative to one another in response to an electrical signal.

U.S. Pat. No. 3,219,052 describes a back pressure regulator valve assembly that includes a poppet type main valve urged into engagement with a seat by a low-rate spring and having an inlet end connected to a tank and an upper end located in a cavity under pressure from the tank, thereby maintaining the valve in a closed position. A pilot valve associated with the main valve functions, upon an increase in tank pressure above a predetermined value, to relieve the pressure on the upper end of the main valve, allowing the poppet to disengage from the seat and permitting a flow of gas through the main valve to relieve the pressure in the tank.

SUMMARY OF THE INVENTION

The present invention is directed to an electromechanical valve assembly for regulating and shutting off the flow of a oxygen from a compressed oxygen source in an aircraft. The valve assembly comprises a valve housing that includes an inlet provided with a fitting for sealable connection with the compressed oxygen source, an outlet, and a connecting passageway for enabling the flow of oxygen from the inlet to the outlet.

The valve assembly further comprises: a spring-biased conical poppet disposed in and movable within the passageway; a spring-biased pressure regulating piston engagable with the conical poppet to maintain the poppet in an open position; a push rod engagable with the conical poppet to maintain the poppet in a closed position; and a movable seat disposed in the passageway, and engagable with the conical poppet to regulate gas flow through the passageway. The movable seat is actuated by an electric motor assembly that is effective to move the seat either towards the conical poppet, or away from the poppet and towards the pressure regulating piston.

Actuation of the motor assembly to cause the movable seat to move towards the conical poppet enables the poppet to engage the push rod, resulting in closing of the valve assembly and shutting off of the oxygen flow from the compressed oxygen source. Actuation of the motor assembly to cause the movable seat to move towards the pressure regulating piston enables the poppet to contact the pressure regulating piston, resulting in opening of the valve assembly and regulation of the oxygen flow from the compressed oxygen source by the pressure regulating piston.

DETAILED DESCRIPTION OF THE INVENTION

Figure 1:
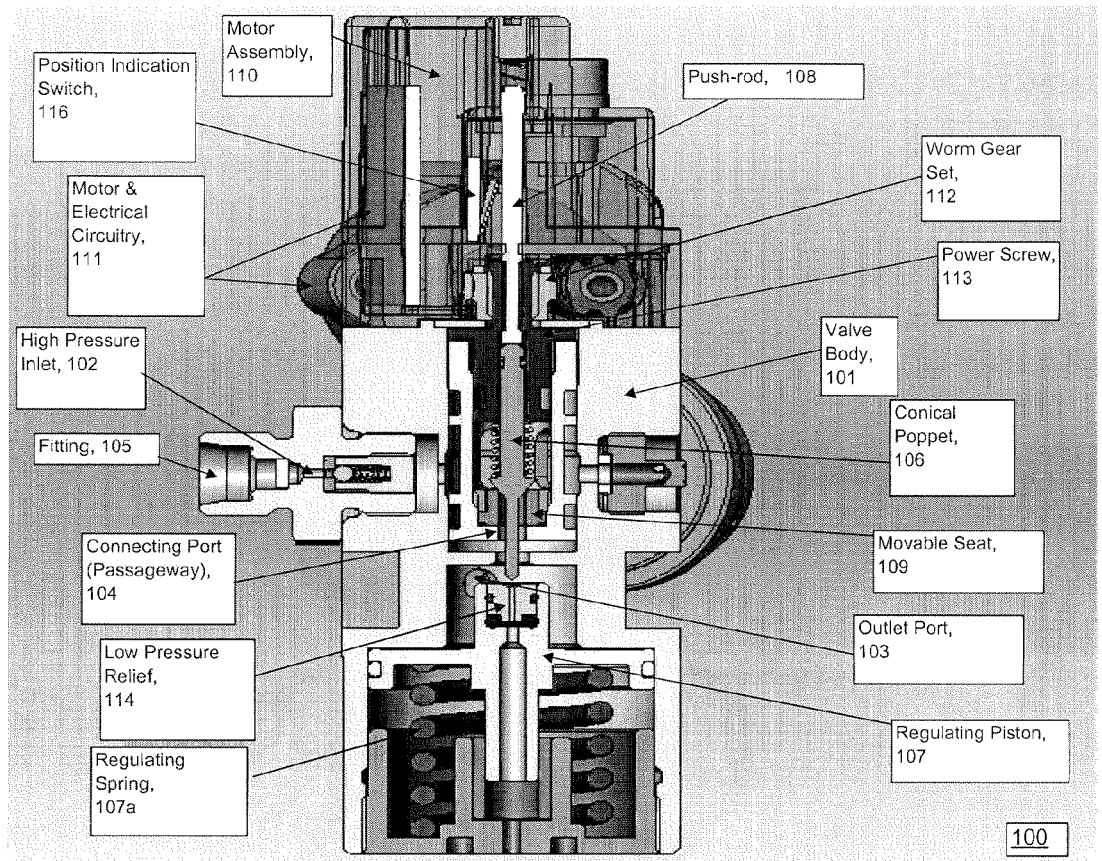
FIG. 1 is a cross-sectional view of the electromechanical valve assembly of the present invention.

Controlling the output of high pressure fluids typically entails the use of a hand-valve having a fixed orifice in combination with a pressure regulator provided with a variable orifice that predictably responds to varying inputs to give a relatively constant output. The electromechanical valve assembly of the present invention, which effectively integrates the hand-valve and pressure regulator into a single component, is electronically controlled, allowing for actuation from a position remote from the compressed oxygen source, typically an oxygen cylinder located in the tail section of the aircraft. Thus, the valve assembly connected to the cylinder may be actuated by the aircraft pilot flipping a switch in the cockpit. When the switch is toggled, a motor is commanded to rotate, the speed and duration of the motor operation being controlled by the electrical circuit.

Once the valve has reached the intended position, an indicator light in the cockpit signals the pilot that the valve has been successfully actuated. The illumination of the indicator light is driven by the actual position of the valve, not by the number of electrical signals sent to the motor, thereby reducing any false indications caused by mechanical failure.

On most conventional valves, the poppet is moved to toggle between open and closed positions, and on most conventional pressure regulators, the poppet acts as a normally open valve that remains in contact with a regulating piston. Integrating the valve-pressure regulator in accordance with the present invention is accomplished by using a movable seat, which enables the use of a single orifice for both flow initiation and pressure regulation. The valve assembly further includes a floating conical poppet that is acted on either by the push-rod when closed, or by the regulating piston when open.

The movable seat pulls the poppet into contact with the push-rod when closing. The push-rod adds a level of redundancy to provide positive closure of the valve. To open the valve, the seat is moved towards the regulating piston, allowing the poppet to be freely acted upon by the regulating piston and regulating spring.

The valve assembly of the present invention is also provided with a downstream pressure relief system. As previously mentioned; when the seat assembly retracts, it pulls the poppet off the regulating piston and closes the valve. When the poppet is pulled away from the regulating piston, a flow path is opened that enables system pressure downstream of the high pressure source to be vented to ambient.

The movable seat is part of an assembly that integrates the open-close function of a hand-valve and the variable orifice of a pressure regulator by using a single orifice. The seat assembly is moved by using a worm gear set with power screw. This combination of mechanical systems has several advantages. For example, the worm gear set disallows any inadvertent movement of the seat assembly, a safety feature that eliminates the possibility of oxygen shut-off during an emergency event. In addition, the worm gear set coupled with a power screw provides an enormous mechanical advantage in addition to speed reduction. A slow opening valve is very desirable, even required by certain high pressure oxygen standards.

The use of a conical poppet facilitates slow opening. Further control of the movement of the poppet is achieved by reducing the effect of the input rotational speed of the motor on the output linear movement of the conical poppet, which can be accomplished by appropriate choice of the gear ratios and power screw thread pitch.

In the electromechanical valve assembly of the present invention, the motor assembly is preferably actuated by a toggle switch whose operation causes the movable seat to move either towards the conical poppet or away from the poppet and towards the pressure regulating piston, which results in, respectively, closing or opening of the valve assembly. The electromechanical valve assembly of the present invention further preferably comprises means engagable with the poppet for indicating whether the valve assembly is in an open or closed position. This indicating means may include, for example, an indicator light. The valve assembly further preferably includes a gauge for measuring the oxygen pressure in the compressed oxygen source.

As shown in FIG. 1, an electromechanical valve assembly 100 comprises a valve housing 101 that includes an inlet 102, an outlet 103, and a connecting passageway 104 connecting for enabling the flow of oxygen from inlet 102 to outlet 103. Inlet 102 is provided with a fitting 105 for sealable connection with a compressed oxygen source (not shown). A spring-biased conical poppet 106 is disposed in and movable within passageway 104. A pressure regulating piston 107 biased by spring 107a is engagable with conical poppet 106 to maintain it in an open position, and a push rod 108 is engagable with conical poppet 106 to maintain it in a closed position.

A movable seat 109 disposed in passageway 104 is engagable with conical poppet 106 to regulate gas flow through passageway 104. Movable seat 109 is actuated by an electric motor assembly 110 that is effective to move seat 109 either towards conical poppet 106, or away from poppet 106 and towards pressure regulating piston 107.

Actuation of motor assembly 110 to cause seat 109 to move towards conical poppet 106 enables poppet 106 to engage push rod 108, resulting in closing of valve assembly 100 and shutting off of oxygen flow from the compressed oxygen source. Conversely, actuation of motor assembly 110 to cause said seat 109 to move towards regulating piston 107 enables poppet 106 to contact pressure regulating piston 107, resulting in opening of valve assembly 100 and regulation of oxygen flow from the compressed oxygen source by pressure regulating piston 107.

Also in accordance with the present invention, electric motor assembly 110 preferably comprises a motor 111 whose rotational movement engages a worm gear set 112 coupled to a power screw 113, wherein power screw 113 engages movable seat 109 to effect its movement. Also, regulating piston 107 further comprises a low pressure relief seat 114 that is engagable with conical poppet 106 so that, when poppet 106 is in an open position, low pressure relief seat 114 is disposed in a closed position. Conversely, when poppet 106 is in a closed position (as depicted in FIG. 1), low pressure relief seat 114 is in an open position, which allows low pressure oxygen trapped between closed poppet 106 and regulating piston 107 to escape to the surrounding environment and/or be routed to the exterior of the aircraft.

When poppet 106 of valve assembly 100 is in an open position, power screw 113 engages a position indication switch 116, thereby sending an electrical signal that indicates valve assembly 100 is open. Typically, the electrical signal actuates a light located in the cockpit. When poppet 106 is moved to the closed position, power screw 113 disengages with position indication switch, interrupting the "valve open" electrical signal, thereby indicating that valve assembly 100 is closed.

Figure 2:
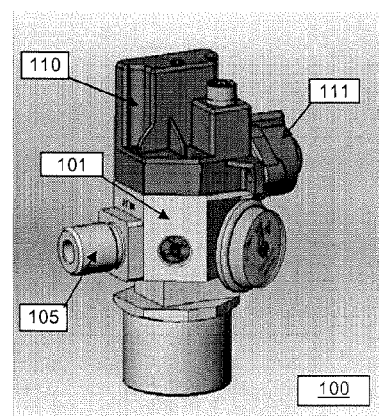
FIG. 2 is a perspective exterior view of the valve assembly of the invention.

FIG. 2, which is a perspective exterior view of electromechanical valve assembly 100, depicts a gauge 201 for measuring pressure in the compressed oxygen source.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed:

1. An electromechanical valve assembly for regulating and shutting off the flow of a oxygen from a compressed oxygen source in an aircraft, said valve assembly comprising:

a valve housing comprising an inlet, an outlet, and a connecting passageway for enabling the flow of oxygen from said inlet to said outlet, said inlet comprising a fitting for sealable connection with said compressed oxygen source;

a spring-biased conical poppet disposed in and movable within said passageway;

a spring-biased pressure regulating piston engagable with said conical poppet to maintain said poppet in an open position;

a push rod engagable with said conical poppet to maintain said poppet in a closed position; and a movable seat disposed in said passageway, and engagable with said conical poppet to regulate gas flow through said passageway, said movable seat being actuated by an electric motor assembly that is effective to move said seat either towards said conical poppet, or away from said poppet and towards said pressure regulating piston;

wherein actuation of said electric motor assembly to cause said movable seat to move towards said conical poppet, enabling said poppet to engage said push rod, resulting in closing of said valve assembly and shutting off of said oxygen flow from said compressed oxygen source; and wherein actuation of said electric motor assembly to cause said movable seat to move towards said regulating piston, enabling said poppet to contact said pressure regulating piston, resulting in opening of said valve assembly and regulation of said oxygen flow from said compressed oxygen source by said pressure regulating piston.

2. The electromechanical valve assembly of claim 1 wherein said electric motor assembly is actuated from a position remote from said compressed oxygen source.

3. The electromechanical valve assembly of claim 2 wherein said compressed oxygen source is located in the tail section of said aircraft, and said electric motor assembly is actuated from the cockpit of said aircraft.

4. The electromechanical valve assembly of claim 3 wherein said electric motor assembly is actuated by a toggle switch whose operation causes said movable seat to move either towards said conical poppet or away from said poppet and towards said pressure regulating piston, resulting in, respectively, closing or opening of said valve assembly.

5. The electromechanical valve assembly of claim 4 further comprising means for indicating whether said conical poppet is in an open or closed position.

6. The electromechanical valve assembly of claim 5 wherein said indicating means comprises a position indicating switch that actuates an indicator light.

7. The electromechanical valve assembly of claim 1 wherein said electric motor assembly comprises a motor whose rotational movement engages a worm gear set coupled to a power screw, wherein said worm gear set comprises a worm gear and a worm, and wherein said power screw engages said movable seat, thereby effecting its movement.

8. The electromechanical valve assembly of claim 1 wherein said regulating piston further comprises a low pressure relief seat that is engagable with said conical poppet;

whereby, when said poppet is in an open position, said low pressure relief seat is disposed in a closed position; and, when said poppet is in a closed position, said low pressure relief seat is in an open position, allowing low pressure oxygen trapped between said closed poppet and said regulating piston to escape to the surrounding environment or be routed to the exterior of said aircraft.

9. The electromechanical valve assembly of claim 1 further comprising a gauge for measuring the oxygen pressure in said compressed oxygen source.

* * * * *